United States Patent
Koyama (10) Patent No.: US 9,715,285 B2
(45) Date of Patent: Jul. 25, 2017

(54) POSITION DETECTION APPARATUS AND POSITION DETECTION METHOD

(71) Applicant: SEIKO EPSON CORPORATION, Tokyo (JP)

(72) Inventor: Takaaki Koyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 70 days.

(21) Appl. No.: 14/598,971

(22) Filed: Jan. 16, 2015

(65) Prior Publication Data
US 2015/0205377 A1 Jul. 23, 2015

(30) Foreign Application Priority Data

Jan. 21, 2014 (JP) ................................. 2014-008666
Apr. 7, 2014 (JP) ................................. 2014-078874

(51) Int. Cl.
| | | |
|---|---|---|
| G06F 3/042 | (2006.01) | |
| G06F 3/041 | (2006.01) | |
| G06F 3/01 | (2006.01) | |
| G06F 3/03 | (2006.01) | |
| G01S 17/00 | (2006.01) | |
| G01S 17/46 | (2006.01) | |
| G01S 17/88 | (2006.01) | |
| G01S 7/497 | (2006.01) | |

(52) U.S. Cl.
CPC ............ G06F 3/0325 (2013.01); G01S 7/497 (2013.01); G01S 17/003 (2013.01); G01S 17/46 (2013.01); G01S 17/88 (2013.01)

(58) Field of Classification Search
CPC ..... G06F 3/0428; G06F 3/0421; G06F 3/0416
See application file for complete search history.

(56) References Cited

U.S. PATENT DOCUMENTS

| | | | |
|---|---|---|---|
| 6,421,042 B1 * | 7/2002 | Omura | G06F 3/011 |
| | | | 345/156 |
| 6,429,856 B1 * | 8/2002 | Omura | G06F 3/0416 |
| | | | 178/18.09 |
| 8,116,518 B2 | 2/2012 | Shamaie et al. | |
| 2010/0087258 A1 * | 4/2010 | Moriwaki | A63F 13/10 |
| | | | 463/43 |
| 2011/0279827 A1 * | 11/2011 | Onishi | G06F 3/0428 |
| | | | 356/614 |
| 2011/0310354 A1 * | 12/2011 | Fujimori | G03B 21/13 |
| | | | 353/31 |
| 2012/0098852 A1 * | 4/2012 | Kuribayashi | G06F 3/0426 |
| | | | 345/592 |
| 2012/0113436 A1 * | 5/2012 | Kiyose | G06F 3/0421 |
| | | | 356/615 |

(Continued)

FOREIGN PATENT DOCUMENTS

JP 5015270 B2 8/2012

*Primary Examiner* — Lin Li
(74) *Attorney, Agent, or Firm* — Oliff PLC (57) ABSTRACT

A position detection apparatus includes a projection unit that projects an image, a radiation unit that radiates light, a detection unit that detects reflected light of the light radiated from the radiation unit, and an output control unit that performs control for outputting information corresponding to a detection position of the reflected light based on a detection result from the detection unit when a radiation direction of the light radiated from the radiation unit is adjusted.

17 Claims, 7 Drawing Sheets

(56) References Cited

U.S. PATENT DOCUMENTS

2012/0249418 A1* 10/2012 Onishi .................. G06F 3/0421
 345/156
2012/0297336 A1* 11/2012 Lin ....................... G06F 3/0488
 715/800
2015/0103093 A1* 4/2015 Bryant .................. G06T 11/001
 345/595

* cited by examiner

POSITION DETECTION APPARATUS AND POSITION DETECTION METHOD

The entire disclosure of Japanese Patent Application Nos. 2014-008666, filed Jan. 21, 2014 and 2014-078874, filed Apr. 7, 2014 are expressly incorporated by reference herein.

BACKGROUND

1. Technical Field

The present invention relates to a position detection apparatus and a position detection method.

2. Related Art

There is a known apparatus in which when an image is projected on a projection surface by a projection unit, the projection surface on which the image is projected is irradiated with light and light obtained by reflection of the light from an indicator operated by a user is imaged to detect the position of the indicator (refer to Japanese Patent No. 5015270).

However, in the above-described apparatus, the radiation direction of the light with respect to the projection surface is not easily adjusted in some cases. In addition, when an image is displayed on a display surface by various display devices instead of the above-described projection unit, the same problem also arises in a case in which the display surface is irradiated with light.

SUMMARY

An advantage of some aspects of the invention is to provide a position detection apparatus and a position detection method capable of easily adjusting a radiation direction of light.

An aspect of the invention is directed to a position detection apparatus including a projection unit that projects an image, a radiation unit that radiates light, a detection unit that detects reflected light of the light radiated from the radiation unit, and an output control unit that performs control for outputting information corresponding to a detection position of the reflected light based on a detection result from the detection unit when a radiation direction of the light radiated from the radiation unit is adjusted.

With this configuration, since the position detection apparatus outputs the information corresponding to the position of the reflected light detected by the detection unit, the radiation direction of the light can be easily adjusted.

In the aspect of the invention, the position detection apparatus may further include a change unit that changes the radiation direction of the light radiated from the radiation unit.

With this configuration, since the position detection apparatus changes the direction of the light radiated from the radiation unit, the direction of the radiated light can be easily changed without changing the position of the radiation unit.

In the aspect of the invention, in the position detection apparatus, the output control unit may control the projection unit to project an image including a first mark onto a position corresponding to the detection position of the reflected light.

With this configuration, the position detection apparatus controls the projection unit to project the image including the first mark onto the position corresponding to the detection position of the reflected light. Therefore, a user can intuitively recognize the radiation direction of light in an infrared region which is invisible to a human from visible information that is visually recognizable.

In the aspect of the invention, in the position detection apparatus, the output control unit may control the projection unit to project an image including a second mark onto a target position for the first mark.

With this configuration, the position detection apparatus controls the projection unit to project the image including the second mark onto the target position for the first mark. Therefore, the user can more clearly recognize the radiation direction of light in an infrared region which is invisible to a human based on the positional relationship between these two marks.

In the aspect of the invention, in the position detection apparatus, the output control unit may change the shape of either or both of the first mark and the second mark when the first mark and the second mark have a predetermined positional relationship, but does not in other cases.

With this configuration, since the position detection apparatus changes the shape of either or both of the first mark and the second mark when the first mark and the second mark have the predetermined positional relationship, but does not in other cases, the user can be notified of the direction of the light radiated from the radiation unit being directed in an appropriate direction by the change in the shape of either or both of the marks.

In the aspect of the invention, in the position detection apparatus, the output control unit may change the color of either or both of the first mark and the second mark when the first mark and the second mark have a predetermined positional relationship, but does not in other cases.

With this configuration, since the position detection apparatus changes the color of either or both of the first mark and the second mark when the first mark and the second mark have the predetermined positional relationship, but does not in other cases, the user can be notified of the direction of the light radiated from the radiation unit being directed in an appropriate direction by the change in the color of either or both of the marks.

In the aspect of the invention, in the position detection apparatus, the output control unit may control the projection unit to project an image including information indicating a positional state when the detection position of the reflected light is a predetermined position.

With this configuration, since the position detection apparatus controls the projection unit to project the image including information indicating the positional state when the detection position of the reflected light is the predetermined position, the user can be notified of the direction of the light radiated from the radiation unit being directed in an appropriate direction by the projected information.

In the aspect of the invention, in the position detection apparatus, the output control unit may perform control for outputting voice information indicating a positional state when the detection position of the reflected light is a predetermined position.

With this configuration, since the position detection apparatus performs control for outputting the voice information indicating the positional state when the detection position of the reflected light is the predetermined position, the user can be notified of the direction of the light radiated from the radiation unit being directed in an appropriate direction by the voice information.

Another aspect of the invention is directed to a position detection method including projecting an image, radiating light, detecting reflected light of the light, and performing control for outputting information corresponding to a detection position of the reflected light based on a detected result when adjusting a radiation direction of the light.

With this configuration, since the reflected light of the light is detected and the information corresponding to the detection position of the reflected light is output based on the detected result in the position detection method, the radiation direction of the light can be easily adjusted.

Still another aspect of the invention is directed to a position detection apparatus including a projection unit that projects an image on a projection surface, a radiation unit that radiates a planar light curtain along the projection surface, a detection unit that detects reflected light obtained, by reflection of the light curtain from a reflector installed on the projection surface to adjust a radiation direction of the light curtain, and an output control unit that performs control for outputting information corresponding to a detection position of the reflected light based on a detection result from the detection unit.

With this configuration, since the position detection apparatus projects an image on the projection surface, radiates the planar light curtain along the projection surface, detects the reflected light obtained by reflection of the light curtain from the reflector installed on the projection surface to adjust the radiation direction of the light curtain, and performs control for outputting the information corresponding to the detection position of the reflected light based on the detection result, the radiation direction can be easily adjusted by using the reflector.

In the aspect of the invention, the position detection apparatus may further include an installation position presenting unit that causes the projection unit to project a mark indicating a position for the reflector to be installed on the projection surface.

With this configuration, since the position detection apparatus causes the projection unit to project the mark indicating the position for the reflector to be installed on the projection surface, the reflector can be installed at an appropriate position.

In the aspect of the invention, the position detection apparatus may further include a change unit that turns the light curtain using a predetermined straight line extending along the light curtain through the radiation unit as a rotation axis, and the installation position presenting unit may project the mark to install the reflector on the predetermined straight line.

With this configuration, since the position detection apparatus turns the light curtain using the predetermined straight line extending along the light curtain through the radiation unit as the rotation axis and projects the mark to install the reflector on the predetermined straight line, in the case in which the light curtain can be turned around plural straight lines (rotation axes), the respective adjustment results can be prevented from interfering with each other.

Yet another aspect of the invention is directed to a position detection apparatus including a display unit that displays an image, a radiation unit that radiates light, a detection unit that detects reflected light of the light radiated from the radiation unit, and an output control unit that performs control for outputting information corresponding to the detection position of the reflected light based on the detection result from the detection unit when the radiation direction of the light radiated from the radiation unit is adjusted.

With this configuration, since the position detection apparatus displays an image, radiates light, detects reflected light of the radiated light, and outputs information corresponding to the detection position of the reflected light based on the detection result, the radiation direction of the light can be easily adjusted.

As described above, since the position detection apparatus outputs the information corresponding to the position of the reflected light defected by the detection unit, the radiation direction of the light can be easily adjusted.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
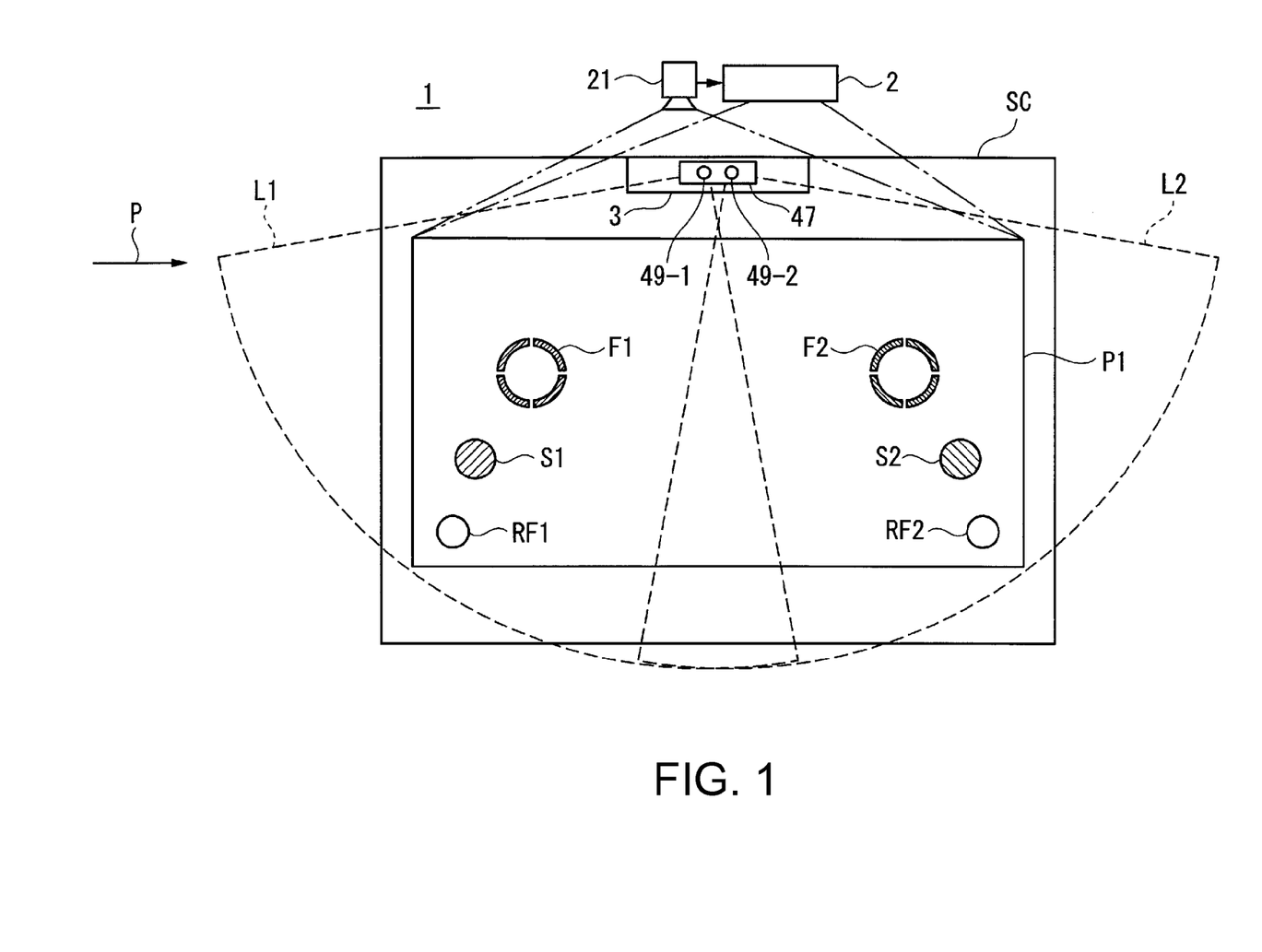
FIG. 1 is a view schematically showing an example of a state in which a position detection apparatus according to a first embodiment is used.

Hereinafter, a first embodiment of the invention will be described with reference to the drawings. FIG. 1 is a view schematically showing an example of a state in which a position detection apparatus 1 according to a first embodiment is used. In the first embodiment, the position detection apparatus 1 includes a projector 2, a light curtain generator 3, and an imaging unit 21. In FIG. 1, the projector 2, the light curtain generator 3, and the imaging unit 21 are respectively shown as separate components only for convenience, and the components may be replaced, with integrated hardware of two or more thereof. In the embodiment, a configuration in which the projector 2 includes the imaging unit 21 therein will be described.

Figure 2:
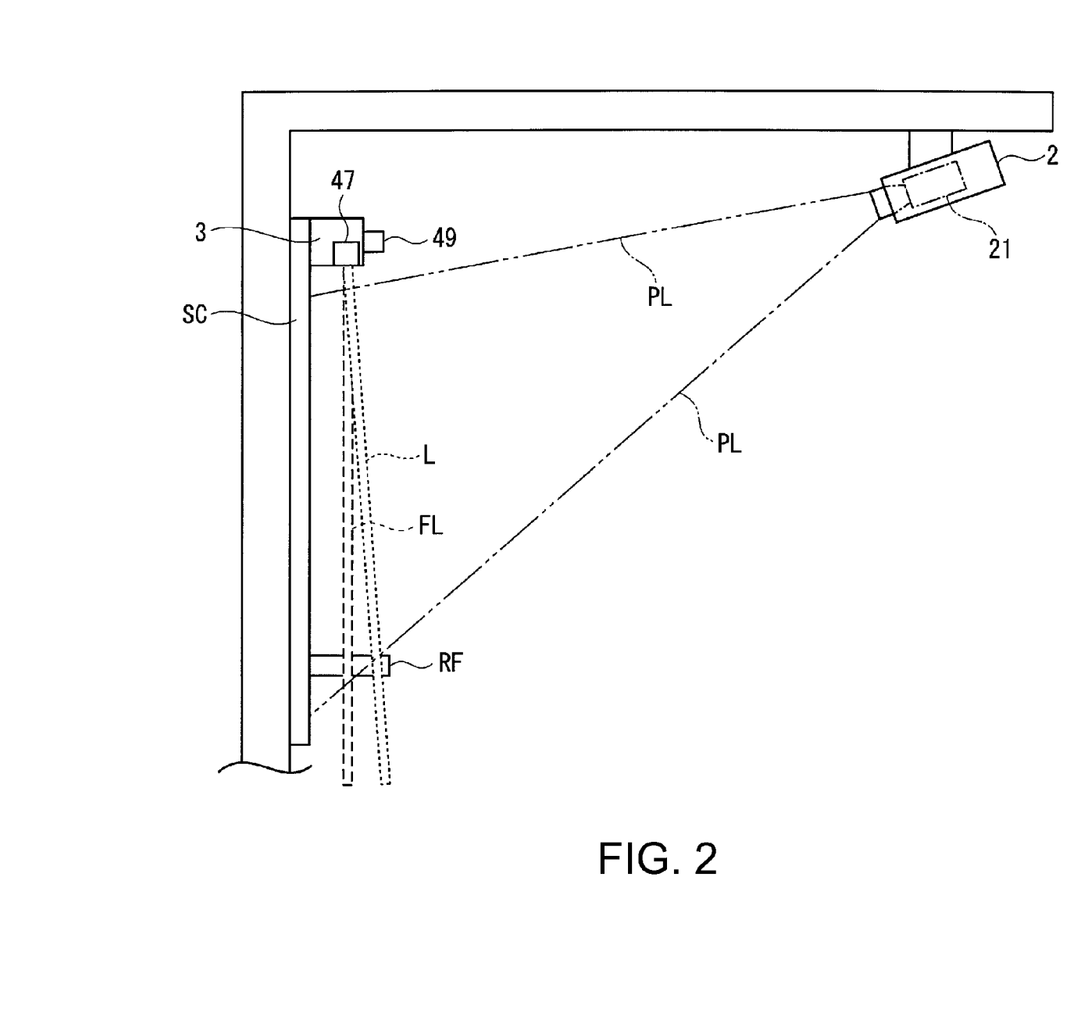
FIG. 2 is a side view showing a light curtain generator and a screen when viewed from the direction of an arrow shown in FIG. 1.

The imaging unit 21 is, for example, a camera including a charge coupled device (CCD), a complementary metal oxide semiconductor (CMOS), or the like, which is an imaging device that converts condensed light into an electric signal. In the embodiment, the imaging unit 21 is hardware combined with the projector 2 as shown in FIG. 2. The imaging unit 21 may be separately provided from the projector 2 and communicably connected to the projector 2 by wire or wirelessly instead of being integrated with the projector 2. Further, the imaging unit 21 is disposed at a position where the imaging unit can image reflected light obtained by reflection of light in an infrared region (wavelength range), radiated from the light curtain generator 3.

The imaging unit 21 images a projection image P1 projected on a screen SC by the projector 2 in order to output the imaged projection image P1 to the projector 2. For example, an infrared light filter for selectively receiving light in the infrared region, radiated from, the light curtain generator 3 as light curtains L1 and L2, is attached to the imaging unit 21. For example, a mechanism that can be detachably attached to a lens of the imaging unit 21 is attached to the infrared light filter.

Here, the light curtains L1 and L2 shown in FIG. 1 are, for example, light in an infrared region, radiated from the light curtain generator 3 to a planar region along the screen SC (substantially parallel with the screen SC). In the embodiment, when there is no need to distinguish between the light curtains L1 and L2, the light curtains are collectively referred to as a light curtain L. Further, the light curtain L may foe light having other shapes instead of the light radiated to the planar region.

The projector 2 projects light of various images onto the screen SC. The image according to the image light is projected onto the screen SC as the projection image P1. As the screen SC, instead of an exclusive screen for displaying the projection image P1, a wall or a flat surface of an object such as the upper surface of a table may be used. On the screen SC, cylindrical reflectors RF1 and RF2 are installed at predetermined positions. The reflectors RF1 and RF2 are installed by a user when the angle of the light curtain is adjusted. In the following description, when there is no need to distinguish between the reflectors RF1 and RF2, the reflectors are collectively referred to as a reflector RF. The reflector RF is formed by using a material that reflects the light in the infrared region, radiated by the light curtain generator 3, and for example, is formed of plastic or the like. In addition, the reflector RF can be detachably attached to the screen SC by a magnet, a sucker, a double-sided adhesive tape, or the like, but may be supported by a human hand or the like. Further, the reflector RF may have other shapes such as a rectangular parallelepiped shape instead of the cylindrical shape.

In the embodiment, the projector 2 has two functional modes including a normal use mode and a light curtain angle adjustment mode. The mode of the projector 2 can be switched to either of these two modes by the operation of the user. In the normal use mode, the projector 2 acquires the imaged image from the imaging unit 21 and detects the position of the reflected light on the acquired imaged image. The reflected light is light obtained such that the light curtains L1 and L2 which are light in an infrared region, radiated by the light curtain generator 3 are reflected from an indicator. Here, the indicator is a finger of a user, a stick, a pen, or the like and is a type of reflector which reflects the light curtain L. In the embodiment, for convenience, the reflector in the normal use mode is referred to as the indicator. The projector 2 calculates a position indicated by the user with the indicator based on the detected position of the reflected light (for example, the position on the projection image P1). Then, the projector 2 projects a mark such as a cursor onto the calculated position. Accordingly, the mark is displayed at the position indicated by the user with the indicator.

In addition, in the light curtain angle adjustment mode, the projector 2 acquires the imaged image from the imaging unit 21 and detects the position of the reflected light on the acquired imaged image. Thus fax, the same manner as in the normal use mode is applied. The projector 2 projects a predetermined mark onto a position corresponding to the defected position on the screen SC based on the detected position of the reflected light. As the mark, in the embodiment, a mark different from the cursor projected in the normal use mode is used, but these marks may be the same.

Specifically, the projector 2 detects the position of the reflected light from the reflector RF1 installed at a predetermined position of the screen SC on the imaged image. The projector 2 projects a circular mark S1 shown in FIG. 1 onto a position corresponding to the detected position based on the detected position of the reflected light from the reflector RF1 on the imaged image. The mark S1 is an adjustment mark used for adjusting the radiation direction of the light curtain L1. When, the position of the reflector RF1 is fixed, the position of the reflected light from the reflector RF1 on the imaged image changes according to the change in the radiation direction of the light curtain L1. Therefore, the position of the adjustment mark S1 also changes according to the change in the radiation direction of the light curtain L1.

In the same manner, the projector 2 detects the position of the reflected light from the reflector RF2 installed at a predetermined position of the screen SC on the imaged image. Then, the projector 2 projects a circular mark S2 shown in FIG. 1 onto a position corresponding to the detected position based the detected position of the reflected light from the reflector RF2 on the imaged image. The mark S2 is an adjustment mark used for adjusting the radiation direction of the light curtain L2. When the position of the reflector RF2 is fixed, the position of the reflected light from the reflector RF2 on the imaged image changes according to the change in the radiation direction of the light curtain L2. Therefore, the position of the adjustment mark S2 also changes according to the change in the radiation direction of the light curtain L2.

The projector 2 may project a mark indicating a predetermined position at which the reflector RF1 or RF2 is installed on the screen SC when the mode of the projector is set to the light curtain angle adjustment mode to present the position to the user. Hereinafter, when there is no need to distinguish between the adjustment marks S1 and S2, the marks are collectively referred to as an adjustment mark S. The adjustment marks S1 and S2 may have other shapes, respectively, instead of the circular shape. In the embodiment, the adjustment marks S1 and S2 are colored with different colors, respectively, and for example, the adjustment mark S1 is colored with blue and the adjustment mark S2 is colored with green. The adjustment marks S1 and S2 may have different shapes respectively, instead of different colors, or may have different colors and different shapes. In addition, the two adjustment marks S1 and S2 may have the same color and the same shape. Further, the reflector RF may be replaced with other objects, such as a finger, a stick, or a pen, which reflects the light of the light curtain L.

Furthermore, in the light curtain angle adjustment mode, the projector 2 projects the ring-shaped mark F1 shown in FIG. 1 onto the position onto which the adjustment mark S1 is projected when the light curtain L1 is radiated in a desired radiation direction. The user can visually and intuitively adjust the radiation direction of the light curtain L1 to a desired radiation direction by changing the radiation direction of the light curtain L1 such that the circular adjustment mark S1 falls inside the ring of the ring-shaped mark F1. In the following description, the mark F1 is referred to as an appropriate position mark F1.

In the same manner, the projector 2 projects the ring-shaped mark F2 shown in FIG. 1 onto the position onto which the adjustment mark S2 is projected when the light curtain L2 is radiated in a desired radiation direction. The user can visually and intuitively adjust the radiation direction of the light curtain L2 to a desired, radiation direction by changing the radiation direction of the light curtain L2 such that the circular adjustment mark S2 fails inside the ring of the ring-shaped mark F2. In the following description, the mark F2 is referred to as an appropriate position mark F2.

Here, the desired radiation directions of the light curtains L1 and L2 refer to directions substantially parallel to the screen SC in the embodiment. However, the directions are not limited thereto and a direction having a predetermined angle other than the direction substantially parallel to the screen SC may be used.

In addition, in the following description, when there is no need to distinguish between the appropriate position marks F1 and F2, these marks are collectively referred to as an appropriate position mark F.

Further, the appropriate position mark F may have another shape different from the ring shape. In the embodiment, the appropriate position marks F1 and F2 are respectively colored with different colors. For example, primary colors are used as a preferable example and the appropriate position mark F1 paired with the adjustment mark S1 is colored with blue and the appropriate position mark F2 paired with the adjustment mark S2 is colored with green, but there is not limited thereto. In addition, the adjustment marks S1 and S2 may have different shapes respectively, instead of different colors, and may have different colors and different shapes. Further, the two appropriate position marks F1 and F2 may have the same color and the same shape.

In this manner, the position detection apparatus 1 can provide a method for visually and intuitively adjusting the radiation direction of the light curtain L by using the adjustment mark S and the appropriate position mark F of the user.

The light curtain generator 3 includes, for example, a light emitter 47, and angle adjustment dials 49-1 and 49-2. The light curtain generator 3 is installed above the screen SC as shown in FIG. 2 and radiates the light curtains L1 and L2 to two fan-shaped flat regions that cover the screen SC shown in FIG. 1. Further, the light curtain generator 3 is an example of a radiation unit.

The wavelength range of the light curtain L is, for example, a wavelength range including infrared light (for example, the infrared region including a wavelength of about 940 nanometers). However, instead of the above wavelength range, the wavelength range may be another wavelength range such as visible light. The light curtain generator 3 may be installed below the screen SC, or at the left end or the right end of the screen SC, or the like, instead of being installed above the screen SC.

The light emitter 47 radiates planar light as the light curtain L. The light emitter 47 is, for example, a light emitting diode (LED) or a laser diode (LD) to which a collimator lens, a Powell lens, or any other optical system member is attached. In addition, a member including a mechanism that changes the radiation direction of the light curtain L1 radiated from the light emitter 47 using the angle adjustment dial 49-1 is attached to the light emitter 47. Further, a member including a mechanism that changes the radiation direction of the light curtain L2 radiated from the light emitter 47 using the angle adjustment dial 49-2 is attached to the light emitter 47.

The light curtain generator 3 changes the radiation direction of the light curtain L1 when the user rotates the angle adjustment dial 49-1. In addition, the light curtain generator 3 changes the radiation direction of the light curtain L2 when the user rotates the angle adjustment dial 49-2. In the embodiment, when there is no need to distinguish between the angle adjustment dial 49-1 and the angle adjustment dial 49-2, these dials are collectively referred, to as an angle adjustment dial 49. The angle adjustment dial 49 is an example of a change unit. In the embodiment, for example, the light emitter 47 radiates the light curtain L1 and the light curtain L2 respectively using light from different light sources (such as the aforementioned LED). However, instead of using different light sources, the light emitter may radiate light from, one light source or from three or more light sources.

Here, a state in which the radiation direction of the light curtain L is changed with the angle adjustment dial 49 will be described with reference to FIG. 2. FIG. 2 is a side view showing the light curtain generator 3 and the screen SC when viewed from the direction of the arrow P shown in FIG. 1. As shown in FIG. 2, for example, the projector 2 is installed on the ceiling and displays the projection image P1 on the screen SC by projecting projection light PL. Further, the projector 2 may be installed on, for example, a table, a wall or the like, instead of the ceiling.

In addition, the light curtain generator 3 is installed on the upper end of the screen SC. The light emitter 47 of the light curtain generator 3 radiates the light curtain L in, for example, the radiation direction indicated by the dotted line in FIG. 2 along the screen SC. For example, the light emitter 47 changes the radiation direction of the light curtain L toward the direction of a region FL indicated by the broken line in FIG. 2 (appropriate direction in FIG. 2) when the user rotates the angle adjustment dial 49.

Figure 3:
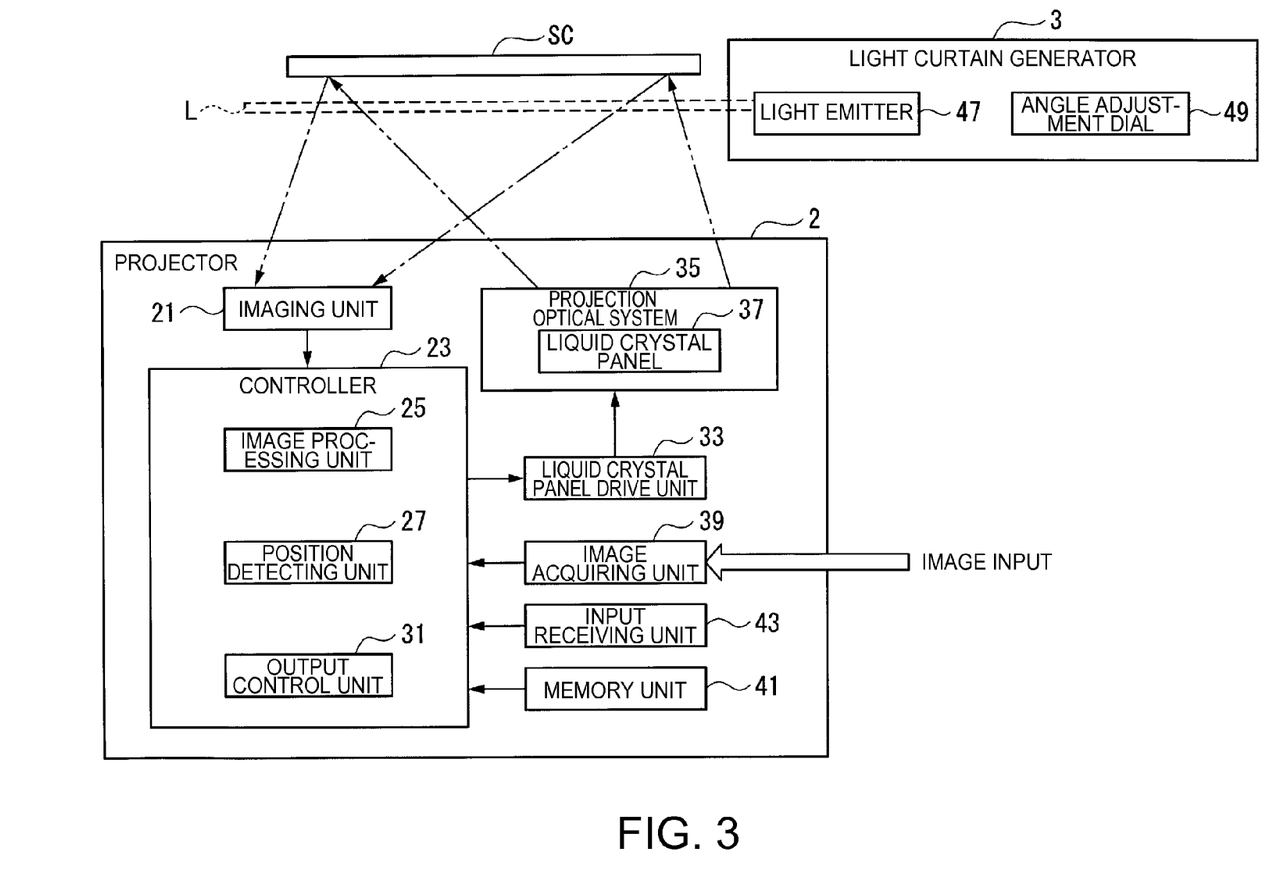
FIG. 3 is a view showing an example of the functional configuration of a projector and the light curtain generator provided in the position detection apparatus.

Next, the functional configuration of the projector 2 and the light curtain generator 3 provided in the position detection apparatus 1 will be described with reference to FIG. 3. FIG. 3 is a view showing an example of the functional configuration of the projector 2 and the light curtain generator 3 provided in the position detection apparatus 1. The projector 2 includes a controller 23, a liquid crystal panel drive unit 33, a projection optical system 35 including liquid crystal panels 37, an image acquiring unit 39, a memory unit 41, and an input receiving unit 43, as well as the imaging unit 21.

The controller 23 includes an image processing unit 25, a position detecting unit 27, and an output control unit 31. In the embodiment, a part of or all of the functional components provided in the controller 23 are configured by using a field-programmable gate array (FPGA) (not shown), but instead of the above configuration, a central processing unit (CPU) (not shown) may read various programs stored by the memory unit 41 and perform the read programs. The controller 23 controls the mode of the projector 2 to be switched to either of the normal use mode and the light curtain angle adjustment mode through the operation from the user received by the input receiving unit 43.

The image processing unit 25 converts an image signal acquired from the image acquiring unit 39 into image information indicating the gradations of each of the pixels in the liquid crystal panels 37 provided in the projection optical system 35 for each of RGB (red, green, blue). In addition, when the projector 2 is in the normal use mode, the image processing unit 25 superimposes the information of a mark such as a cursor on the image information to be displayed such that the mark is displayed at the position corresponding to the position of the indicator detected by the position detecting unit 27. Further, when the projector 2 is in the angle adjustment mode of the light curtain L, the image processing unit 25 superimposes the information of the adjustment mark S on the above-described image information to be displayed such that the adjustment mark S is displayed at the position corresponding to the detected position based on the position of the reflected light from the reflector RF detected by the position detecting unit 27.

Specifically, the image processing unit 25 converts the coordinates showing the detected position of the reflected light from the reflector RF on the imaged image into coordinates on the projection image P1. Then, the image processing unit 25 performs a predetermined process on the converted coordinates and the adjustment mark S is displayed at a position shown by the coordinates obtained from the result of the process. Here, the predetermined, process is, for example, a process of transporting a position in a predetermined direction by a predetermined distance. The predetermined process does not necessarily need to be performed.

Further, the image processing unit 25 reads information indicating the position of the appropriate position mark F on the projection image P1 from the memory unit 41 and displays the appropriate position mark F at the read position. In addition, the image processing unit 25 displays various character information (for example, a message or the like) or images on the projection image P1 according to a request from the output control unit 31.

The position detecting unit 27 detects the position (detection position) of the reflected light from the indicator or the reflector RF on the imaged image based on the imaged image in which the reflected light of the light curtain L from the indicator or the reflector RF is imaged. The output control unit 31 determines whether the adjustment mark S of the light curtain L and the appropriate position mark F displayed by the image processing unit 25 are in a predetermined state based on the image imaged by the imaging unit 21. The predetermined state refers to, for example, a state in which the position of the adjustment mark is appropriate, that is, a state in which the circular adjustment mark S falls inside the ring-shaped appropriate position mark F. However, instead of the above-described state, the positional relationship between these marks may become a predetermined positional relationship (for example, a state in which these marks are separated from each other by a predetermined distance and aligned in the vertical direction) or the like.

When it is determined that the adjustment mark S and the appropriate position mark F displayed by the image processing unit 25 are in a predetermined state, the output control unit 31 controls the image processing unit 25 to display information indicating that the angle adjustment of the light curtain L has been completed on the projection image P1. The information indicating that the angle adjustment of the light curtain L has been completed is, for example, character information "angle adjustment of light curtain has been completed", an image informing that the angle adjustment of the light curtain L has been completed, or the like. Further, the output control unit 31 may notify the user of the completion of the angle adjustment of the light curtain L by outputting a voice or an electronic sound instead of displaying the information indicating that the angle adjustment of the light curtain L has been completed on the projection image P1 by the image processing unit 25. In this case, the projector 2 includes hardware that outputs a voice such as a speaker.

The image acquiring unit 39 acquires an image signal from the outside through an image input terminal or the like and outputs the acquired image signal to the controller 23. The liquid crystal panel drive unit 33 applies (drives) driving voltage to each of the pixels in the liquid crystal panels 37 provided in the projection optical system 35 according to the image information input from the image processing unit 25 in the controller 23. By applying the voltage, the liquid crystal panel drive unit 33 allows light incident on the liquid crystal panels 37 from the light source (not shown) provided in the projection optical system 35 to be formed on the liquid crystal panels 37 as light for projecting an image according to image information.

The projection optical system 35 includes a reflector that reflects light emitted from the light source toward the liquid crystal panels 37 and allows the reflected light to be formed on the liquid crystal panels 37 as light for projecting an image according to image information. Then, the projection optical system 35 projects the light formed on the liquid crystal panels 37 for projecting an image on the screen SC through a projection lens (not shown). Further, the light source is, for example, a discharge type light source lamp constituted of an extra-high pressure mercury lamp, metal halide lamp or the like but is not limited to the above-described light source lamps. A light emitting diode (LED) light source or a laser light source may be used.

The liquid crystal panels 37 are, for example, transmission type liquid crystal panels having a pair of transparent substrates between which liquid crystals are sealed and respectively corresponding to RGB which axe primary colors of light. The liquid crystal panel 37 is not limited to the transmission type liquid crystal panel and may be a reflection type liquid crystal panel. In addition, instead of the liquid crystal panel 37, a digital mirror device (DMD) or the like may be used.

The memory unit 41 includes, for example, a random access memory (RAM), a register, a hard disk drive (HDD), a solid state drive (SSD), and the like. The memory unit 41 stores various information, programs, and the like executed by the projector 2.

The input receiving unit 43 is, for example, various operating buttons, operating keys, touch panels, and the like, which receive instructions or the like from the user. Further, the input receiving unit 43 is not limited to being provided (built) in the projector 2 and may be a remote controller that includes various operating buttons, operating keys, touch panels, and the like, which receive input from the user, and transmits information indicating the input received from the user by wire or wirelessly, or the like. In this case, the projector 2 includes a receiving unit that receives the information transmitted from the remote controller.

Figure 4:
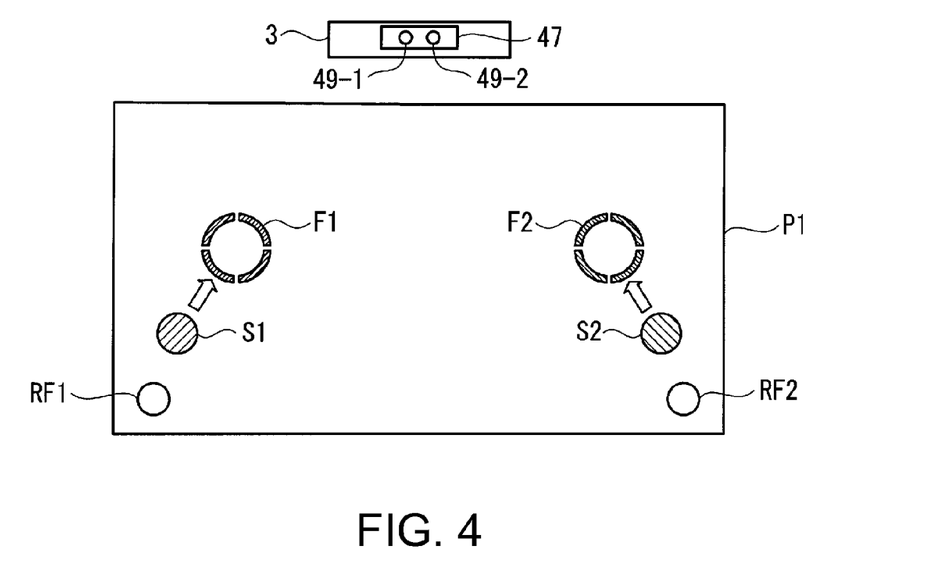
FIG. 4 is a view showing an example of a positional relationship between an adjustment mark and an appropriate position mark when the radiation direction of the light curtain is not adjusted to a desired direction.

Next, a state until the angle adjustment of the light curtain L is completed by rotating the angle adjustment dial 49 will be described with reference to FIGS. 4 and 5. FIG. 4 is a view showing an example of the positional relationship between the adjustment mark S and the appropriate position mark F when the radiation direction of the light curtain L (for example, the angle of the light curtain L relative to the screen SC shown in FIG. 2) is not adjusted to a desired direction.

The light emitter 47 changes the radiation direction of the light curtain L1 when the angle adjustment dial 49-1 is rotated to the left or right by the user. Here, when the angle adjustment dial 49-1 is rotated to the left by the user, the radiation direction of the light curtain L1 is changed and as a result, the adjustment mark S1 moves in the direction toward the appropriate position mark F1. In contrast, when the angle adjustment dial 49-1 is rotated to the right, the radiation direction of the light curtain L1 is changed and as a result, the adjustment mark S1 moves in a direction away from the appropriate position mark F1. In addition, the adjustment mark S1 may also move in the direction away from the appropriate position mark F1 when the angle adjustment dial 49-1 is rotated to the left and the adjustment mark S1 may also move in the direction toward the appropriate position mark F1 when the angle adjustment dial 49-1 is rotated to the right.

In the same manner, the light emitter 47 changes the radiation direction of the light curtain L2 when the angle adjustment dial 49-2 is rotated to the left or right by the user. Here, when the angle adjustment dial 49-2 is rotated, to the left by the user, the radiation direction of the light curtain L2 is changed and as a result, the adjustment mark S2 moves in the direction toward the appropriate position mark F2. In contrast, when the angle adjustment dial 49-2 is rotated to the right, the radiation direction of the light curtain L2 is changed and as a result, the adjustment mark S2 moves in a direction away from the appropriate position mark F2. In addition, the adjustment mark S2 may also move in the direction away from the appropriate position mark F2 when the angle adjustment dial 49-2 is rotated to the left and the adjustment mark S2 may also move in the direction toward the appropriate position mark F2 when the angle adjustment dial 49-2 is rotated to the right.

Figure 5:
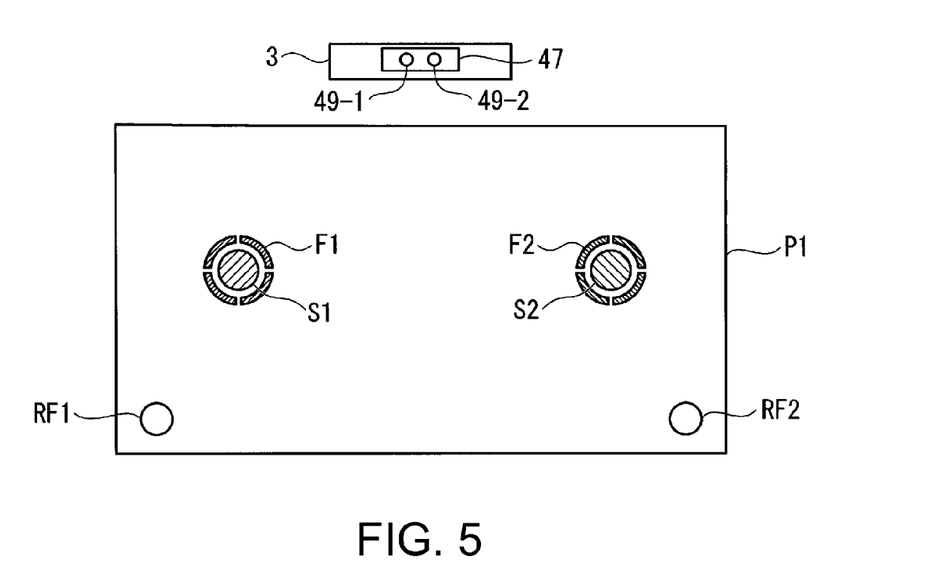
FIG. 5 is a view showing an example of a positional relationship between the adjustment mark and the appropriate position mark when the radiation direction of the light curtain is adjusted to an appropriate direction.

FIG. 5 is a view showing an example of the positional relationship between the adjustment mark S and the appropriate position mark F when the radiation direction of the light curtain L is adjusted to an appropriate direction. When the radiation direction of the light curtain L1 is adjusted to a desired direction by the user, the adjustment mark S1 falls inside the appropriate position mark F1 as shown in FIG. 5. In addition, when the radiation direction of the light curtain L2 is adjusted to a desired direction by the user, the adjustment mark S2 falls inside the appropriate position, mark F2 as shown in FIG. 5. When the user sets the positional relationship between the adjustment mark S and the appropriate position mark F to the positional relationship shown in FIG. 5 with the angle adjustment dial 49, the radiation direction of the light curtain L is changed toward the direction of the region FL shown in FIG. 2 (a desired direction in the embodiment).

When the adjustment mark S and the appropriate position mark F are in a predetermined state, the projector 2 may change the shape or the color of either or both of the adjustment mark S and the appropriate position mark F. In addition, one adjustment mark S and one appropriate position mark F may be provided or three or more adjustment marks S and three or more appropriate position marks F may be provided respectively. When one adjustment mark S and one appropriate position mark F are provided respectively, the adjustment mark S and the appropriate position mark F are projected onto, for example, the center position or left and right ends in the projection image P1, but may be projected onto another position.

In addition, when the adjustment mark S is separated, from the appropriate position mark F by a predetermined distance or more, the projector 2 makes the adjustment mark S bigger than the appropriate position mark F, and when the adjustment mark S approaches the appropriate position mark F in a distance which is less than a predetermined distance, as shown in FIGS. 1, 4, and 5, the size of the adjustment mark S may be a size that falls inside the appropriate position mark F. In this manner, the position detection apparatus 1 enables the user to easily visually recognize the adjustment mark until the adjustment mark S that requires fine adjustment approaches the appropriate position mark F by a distance which is less than a predetermined distance.

Further, when the projector 2 projects the adjustment mark S and the appropriate position mark F, the projector 2 may project white light as a background for these marks so that the color of each of the adjustment mark S and the appropriate position mark F is easily visually recognizable. The color of the background may not be white but may be, for example, black.

In the position detection apparatus 1, the projector 2 may be communicably connected to the light curtain generator 3 and the positional relationship between the adjustment mark S and the appropriate position mark F is detected based on the image imaged by the imaging unit 21 in order to automatically change the radiation direction of the light curtain L to a desired direction. In this case, for example, the information indicating a desired direction is stored in the memory unit 41.

As described above, since the position detection apparatus 1 according to the first embodiment detects reflected light of the light radiated from the light curtain generator 3, and performs control for outputting information corresponding to the detection position of the reflected light based on the detection result, the radiation direction of the light can be easily adjusted. In addition, the position detection apparatus 1 controls the projector 2 to project the adjustment mark S onto the position corresponding to the detection position of the reflected light. Therefore, the user can more intuitively recognize the radiation direction of light in an infrared region which is invisible to a human from visual information that is visually recognizable.

In addition, the position detection apparatus 1 controls the projector 2 to project an image including the appropriate position mark F onto a target position for the adjustment mark S. Therefore, the user can more clearly recognize the radiation direction of light in an infrared region invisible to a human from the positional relationship of the two marks. Further, since the position detection apparatus 1 changes the direction of the light curtain L radiated from the light curtain generator 3, the direction of the radiated light curtain L can be easily changed without changing the position of the light curtain generator 3.

Since the position detection apparatus 1 changes the shape of either or both of the adjustment mark S and the appropriate position mark F when the adjustment mark S and the appropriate position mark F have a predetermined positional relationship, but does not in other cases, the user can be notified of the direction of the light curtain L radiated from the light curtain generator 3 being directed in an appropriate direction by the change in the shape of either or both of the marks.

Since the position detection apparatus 1 changes the color of either or both of the adjustment mark S and the appropriate position mark F when the adjustment mark S and the appropriate position mark F have a predetermined positional relationship, but does not in other cases, the user can be notified of the direction of the light curtain L radiated from the light curtain generator 3 being directed in an appropriate direction by the change in the color of either or both of the marks.

Since the position detection apparatus 1 controls the projector 2 to project an image including character information indicating a positional state when the detection position of the reflected light is a predetermined position, the user can be notified of the direction of the light curtain L radiated from, the light curtain generator 3 being directed in an appropriate direction, by the projected character information.

Since the position detection apparatus 1 performs control for outputting voice information indicating a positional state when the detection position of the reflected light is a predetermined position, the user can be notified of the direction of the light curtain L radiated from the light curtain generator 3 being directed in an appropriate direction by the voice information.

Modification Example 1 of First Embodiment

Hereinafter, Modification Example 1 of the first embodiment of the invention will be described with reference to the drawings. The configuration of the position detection apparatus 1 according to Modification Example 1 of the first embodiment will be described with reference to FIG. 3 since components having the same functions as in the first embodiment are referred to with the same reference numerals. In the position detection apparatus 1 according to Modification Example 1 of the first embodiment, the shape of the adjustment mark and the shape of the appropriate position mark are different from the circular shape and the ring shape shown in FIG. 1.

Figure 6A:
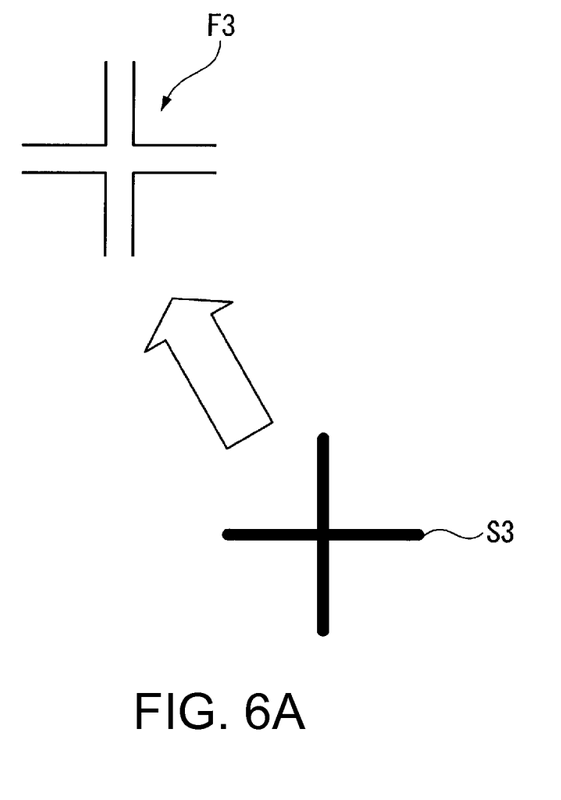
FIGS. 6A and 6B are views showing an example of the shape of an adjustment mark and an appropriate position mark in Modification Example 1 of the first embodiment.
Figure 6B:
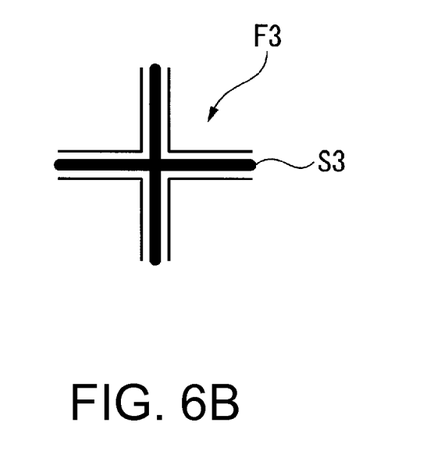

The shape of the adjustment mark and the appropriate position mark in Modification Example 1 of the first embodiment will be described below with reference to FIGS. 6A and 6B. FIGS. 6A and 6B are views showing an example of the shape of the adjustment mark and the appropriate position mark in Modification Example 1 of the first embodiment. FIG. 6A shows a state in which the adjustment mark and the appropriate position mark are projected when the radiation direction of the light curtain L is not adjusted to an appropriate direction. A mark S3 shown in FIG. 6A is an adjustment mark in Modification Example 1 of the first embodiment and has, for example, the shape of a plus sign. In addition, a mark F3 shown in FIG. 6A is an appropriate position mark F3 in Modification Example 1 of the first embodiment and has, for example, the shape of a hollow plus sign.

FIG. 6B shows a state in which the adjustment mark S3 and the appropriate position mark F3 are projected when the radiation direction of the light curtain L is adjusted to an appropriate direction. When the radiation direction of the light curtain L is changed to an appropriate direction by the user rotating the angle adjustment dial 49, the adjustment mark S3 shown in FIG. 6A moves to the position shown in FIG. 6B.

As described above, since the shape of the adjustment mark and the appropriate position mark is not a circular shape in the position detection apparatus 1 according to Modification Example 1 of the first embodiment, the same effect as in the first embodiment can be obtained.

Modification Example 2 of First Embodiment

Hereinafter, Modification Example 2 of the first embodiment of the invention will be described with reference to the drawings. The configuration of the position detection apparatus 1 according to Modification Example 2 of the first embodiment will be described with reference to FIG. 3 since components having the same functions as in the first embodiment are referred to with the same reference numerals. In the position detection apparatus 1 according to Modification Example 2 of the first embodiment, the shape of an adjustment mark and the shape of an appropriate position mark are different from the shapes shown in FIGS. 1 and 6A and 6B.

Figure 7A:
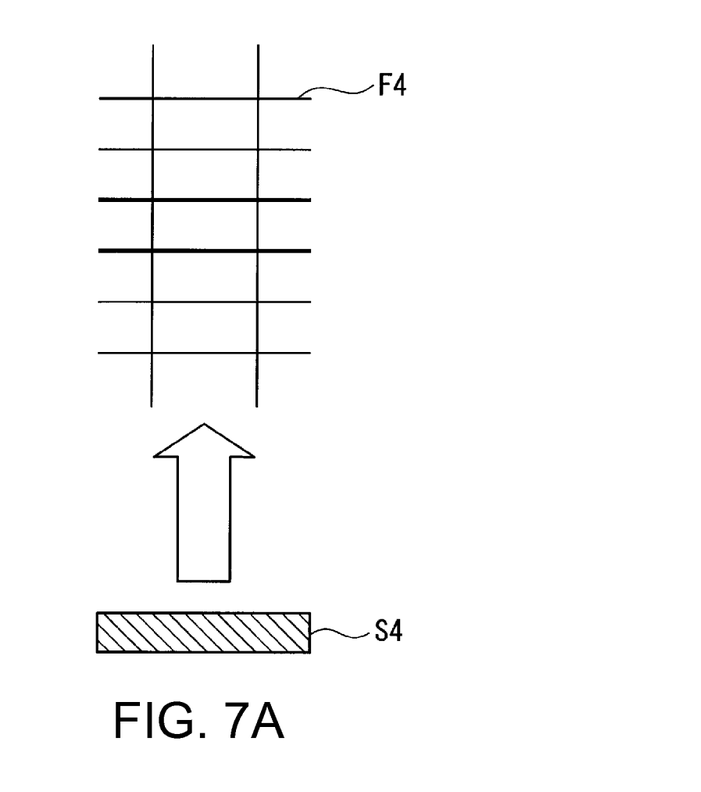
FIGS. 7A and 7B are views showing an example of the shape of an adjustment mark and an appropriate position mark in Modification Example 2 of the first embodiment.
Figure 7B:
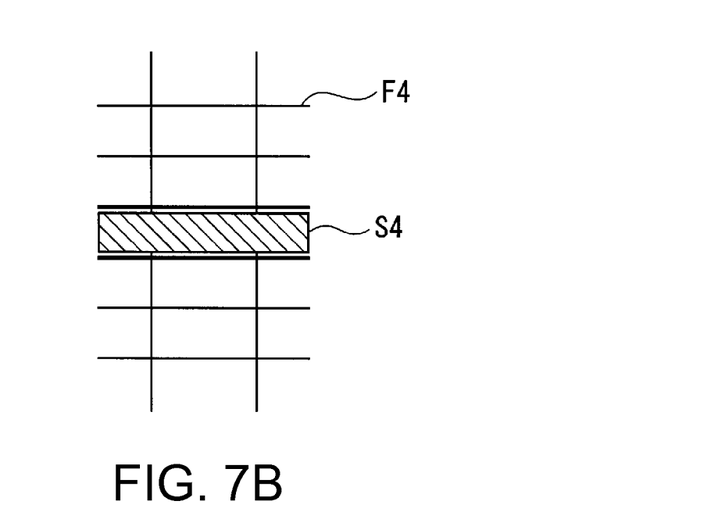

The shape of the adjustment mark and the appropriate position mark in Modification Example 2 of the first embodiment will be described below with reference to FIGS. 7A and 7B. FIGS. 7A and 7B are views showing an example of the shape of the adjustment mark and the appropriate position mark in Modification Example 2 of the first embodiment. FIG. 7A shows a state in which the adjustment mark and the appropriate position mark are projected when the radiation direction of the light curtain L is not adjusted to an appropriate direction. A mark S4 shown in FIG. 7A is an adjustment mark in Modification Example 2 of the first embodiment and has, for example, a rectangular shape. In addition, a mark F4 shown in FIG. 7A is an appropriate position mark in Modification Example 2 of the first embodiment and has, for example, a shape with scales. Further, the appropriate position mark F4 has two thick lines as shown in FIG. 7A. These two thick lines indicate the position on which the adjustment mark S4 is displayed when the radiation direction of the light curtain L is adjusted to an appropriate direction.

FIG. 7B shows a state in which the adjustment mark S4 and the appropriate position mark F4 are projected when the radiation direction of the light curtain L is adjusted to an appropriate direction. When the radiation direction of the light curtain L is changed to an appropriate direction by the user rotating the angle adjustment dial 49, the adjustment mark S4 shown in FIG. 7A moves to the position shown in FIG. 7B.

As described above, since the appropriate position mark has a shape with scales in the position detection apparatus 1 according to Modification Example 2 of the first embodiment, the same effect as in the first embodiment can be obtained and also the radiation direction of the light curtain L can be adjusted using the scales.

Modification Example 3 of First Embodiment

Hereinafter, Modification Example 3 of the first embodiment of the invention will be described with reference to the drawings. The configuration of the position detection apparatus 1 according to Modification Example 3 of the first embodiment will be described with reference to FIG. 3 since components having the same functions as in the first embodiment are referred to with the same reference numerals. In the position detection apparatus 1 according to Modification Example 3 of the first embodiment, instead of changing the angle of the light curtain L relative to the screen SC with the angle adjustment dial 49, the radiation direction of the light curtain L is rotated by the angle adjustment dial 49 using a straight line connecting the angle adjustment dial 49 and the reflector RF as a rotation axis. The straight line connecting the angle adjustment dial 49 and the reflector RF is, for example, a straight line extending along the light curtain L and is a straight line connecting the light emission point of the light emitter 47 to a point at which the central axis of the reflector RF and the light curtain L intersect. However, the straight line may be a straight line connecting two other points.

Figure 8:
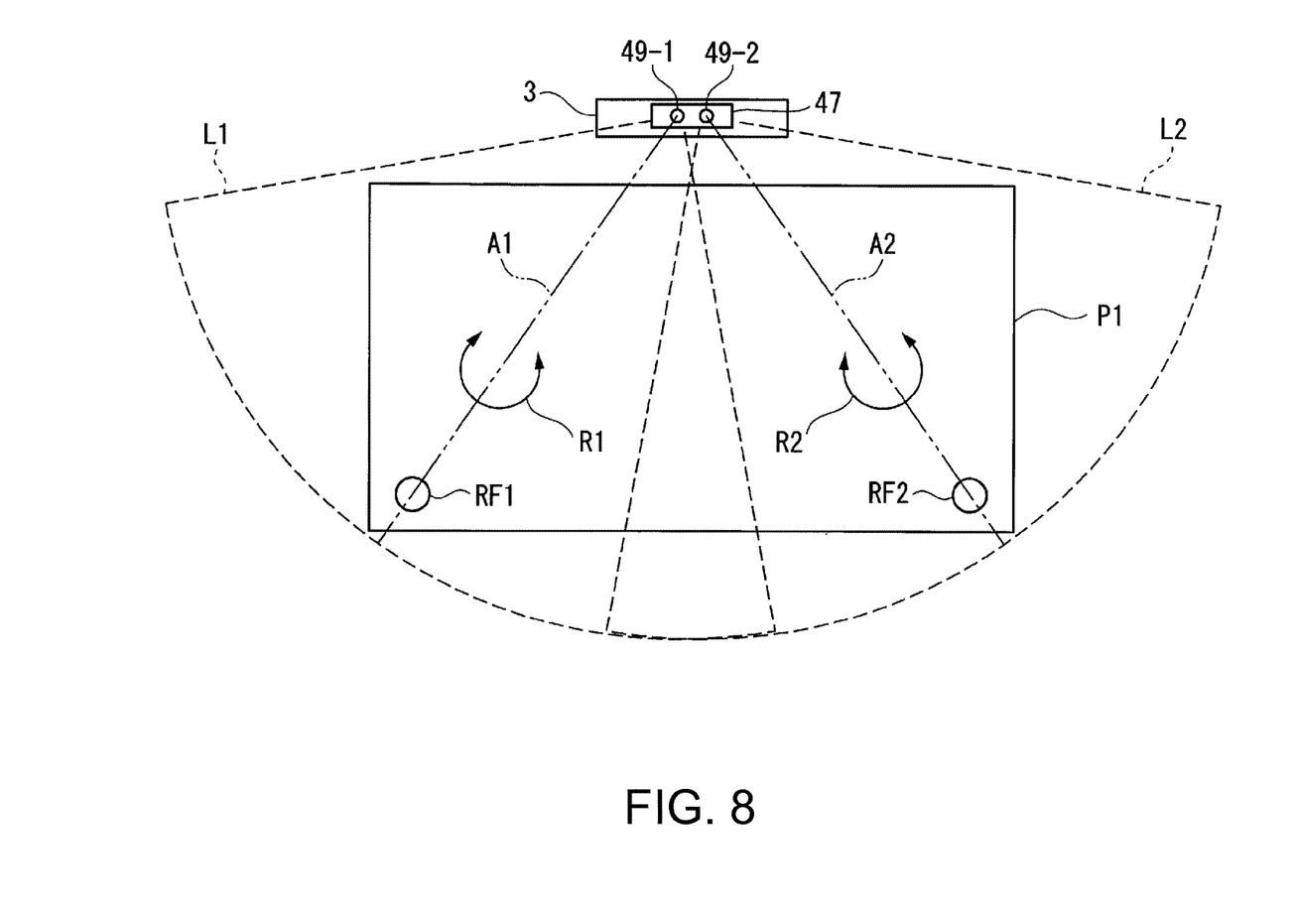
FIG. 8 is a view showing an example of a state in which the radiation direction of the light curtain is changed with an angle adjustment dial.

FIG. 8 is a view showing an example of a state in which the radiation direction of the light curtain L is changed with the angle adjustment dial 49. The light emitter 47 turns the light curtains L1 and L2 around a rotation axis A2 in a rotational direction R2 when the angle adjustment dial 49-1 is rotated by a user. A member including a mechanism that changes the radiation directions of the light curtains L1 and L2 from the light emitter 47 by rotating the angle adjustment dial 49-1 is formed such that the rotation axis A2 is a straight line connecting the angle adjustment dial 49-2 and the reflector RF2.

In the same manner, the light emitter 47 turns the light curtains L1 and L2 around a rotation axis A1 in a rotational direction R1 when the angle adjustment dial 49-2 is rotated by the user. A member including a mechanism that changes the radiation directions of the light curtains L1 and L2 from the light emitter 47 is formed such that the rotation axis A1 is a straight line connecting the angle adjustment dial 49-1 and the reflector RF1.

In this manner, when the rotation axis is formed on the straight line connecting the angle adjustment dial 49 and the reflector RF, during the adjustment of the radiation direction of the light curtain L, the effect of the adjustment of the radiation direction of one light curtain on the adjustment of the radiation direction of the other light curtain is reduced. Further, the light curtains L1 and L2 may be turned around the rotation axis A1 by the rotation of the angle adjustment dial 49-1 and may be turned around the rotation axis A2 by the rotation of the angle adjustment dial 49-2.

As described above, since the position detection apparatus 1 according to Modification Example 3 of the first embodiment rotates the radiation direction of the light curtain L by the angle adjustment dial 49 using the straight line connecting the angle adjustment dial 49 and the reflector RF as a rotation axis, the same effect as in the first embodiment can be obtained. Further, in the position detection apparatus 1, when the radiation direction of the light curtain L is adjusted, the effect of the adjustment of the radiation direction of one light curtain on the adjustment of the radiation direction of the other light curtain can be reduced.

Modification Examples of Above Embodiments

In the description of the above embodiments, the user performs an indication operation with the indicator placed on the screen SC (projection surface, display surface) onto which the front projection type projector 2 projects (displays) an image. However, the user may perform an indication operation on a display screen (display surface) on which a display device (display unit) other than the projector 2 displays an image. Even in this case, the light curtain generator 3 or the imaging unit 21 may be integrated with a display device or may be provided separately from the display device. As the display device other than the projector 2, a rear projection (rear surface projection) type projector, a liquid crystal display, an organic electro luminescence (EL) display, a plasma display, a cathode ray tube (CRT) display, a surface-conduction electron-emitter display (SED), or the like can be used.

In addition, a program for realizing the function of an arbitrary component in the above-described apparatus (for example, position detection apparatus 1) may be executed by recording the program on a computer-readable recording medium and causing a computer system to read the program. The "computer system" here includes operating software (OS) and hardware including peripherals. The "computer-readable recording medium" refers to transportable medium such as a flexible disk, an optical-magnetic disk, a read-only memory (ROM), or a compact disc-read-only memory (CD-ROM), or a storage device included in a computer system, such as a hard disk. Further, the "computer-readable recording medium" may be a medium that retains a program for a predetermined period of time, such as a volatile memory (random-access memory (RAM)) in a computer system that serves as a server or a client when a program is transmitted through a network such as the Internet or through a communication line such as a telephone line.

The above-described program may be transmitted from a computer system whose storage device or the like stores this program, to another computer system through a transmission medium or using transmission waves in the transmission medium. The "transmission medium" for transmitting the program refers to a medium having a function of transmitting information as a network (communication network) such as the Internet or a communication line (communication network) such as a telephone line.

Also, the above-described program may be a program for realizing a part of the above-described functions. Further, the above-described program may be a program that realizes the above-described functions by being combined with a program previously recorded in a computer system, that is, may be a differential file (difference program).

What is claimed is:

1. A position detection apparatus comprising:
a projection unit that projects an image;
a radiation unit that radiates light;
a detection unit that detects reflected light of the light radiated from the radiation unit;
a change unit that adjusts a radiation direction of the light radiated from the radiation unit; and
an output control unit that performs control for outputting information corresponding to a detection position of the reflected light based on a detection result from the detection unit when the radiation direction of the light radiated from the radiation unit is adjusted,
wherein:
the output control unit controls the projection unit to project an image including a first mark onto a position corresponding to the detection position of the reflected light and to project an image including a second mark onto a target position for the first mark;
as the change unit adjusts the radiation direction of the light radiated from the radiation unit, the first mark moves and the second mark remains still; and
the first mark and the second mark are visible.

2. The position detection apparatus according to claim 1, wherein the output control unit changes the shape of either or both of the first mark and the second mark when the first mark and the second mark have a predetermined positional relationship, but does not in other cases.

3. The position detection apparatus according to claim 1, wherein the output control unit changes the color of either or both of the first mark and the second mark when the first mark and the second mark have a predetermined positional relationship, but does not in other cases.

4. The position detection apparatus according to claim 1, wherein the output control unit controls the projection unit to project an image including information indicating a positional state when the detection position of the reflected light is a predetermined position.

5. The position detection apparatus according to claim 1, wherein the output control unit performs control for outputting voice information indicating a positional state when the detection position of the reflected light is a predetermined position.

6. The position detection apparatus according to claim 1, further comprising
an imaging unit that images the reflected light.

7. The position detection apparatus according to claim 6, wherein the imaging unit is a camera that images the reflected light in an infrared region and images the image projected by the projection unit.

8. The position detection apparatus according to claim 1, further comprising
a controller configured to control a mode of the projection unit to switch between a normal use mode and a light radiation angle adjustment mode in response to user operation.

9. A position detection method comprising:
radiating light;
imaging reflected light obtained by reflection of the radiated light with an imaging unit to detect the reflected light;
performing control for outputting information corresponding to a detection position of the reflected light based on the detected result when adjusting a radiation direction of the light;
projecting an image including a first mark onto a position corresponding to the detection position of the reflected light; and
projecting an image including a second mark onto a target position for the first mark,
wherein:
the first mark and the second mark are visible; and
as the radiation direction of the light is adjusted, the first mark moves and the second mark remains still.

10. The position detection method according to claim 9, wherein the imaging unit is a camera that images the reflected light in an infrared region.

11. The position detection method according to claim 9, further comprising
controlling a mode of the projection unit to switch between a normal use mode and a light radiation angle adjustment mode in response to user operation.

12. A position detection apparatus comprising:
a projection unit that projects an image on a projection surface;
a radiation unit that radiates a planar light curtain along the projection surface;
a detection unit that detects reflected light obtained by reflection of the light curtain from a reflector installed on the projection surface to adjust a radiation direction of the light curtain;
a change unit that adjusts the radiation direction of the light curtain; and
an output control unit that performs control for outputting information corresponding to a detection position of the reflected light based on a detection result from the detection unit, wherein:
the output control unit controls the projection unit to project an image including a first mark onto a position corresponding to the detection position of the reflected light and to project an image including a second mark onto a target position for the first mark;
as the change unit adjusts the radiation direction of the light curtain, the first mark moves and the second mark remains still; and
the first mark and the second mark are visible.

13. The position detection apparatus according to claim 12, further comprising
an installation position presenting unit that causes the projection unit to project a mark indicating a position for the reflector to be installed on the projection surface.

14. The position detection apparatus according to claim 13, further comprising
a change unit that turns the light curtain using a predetermined straight line extending along the light curtain through the radiation unit as a rotation axis,
wherein the installation position presenting unit projects the mark to install the reflector on the predetermined straight line.

15. The position detection apparatus according to claim 12, further comprising
an imaging unit that images the reflected light.

16. The position detection apparatus according to claim 15,
wherein the imaging unit is a camera that images the reflected light in an infrared region and images the image on the projection surface.

17. The position detection apparatus according to claim 12, further comprising
a controller configured to control a mode of the projection unit to switch between a normal use mode and a light curtain angle adjustment mode in response to user operation.

* * * * *